(12) United States Patent
Kubo et al.

(10) Patent No.: US 6,659,213 B2
(45) Date of Patent: Dec. 9, 2003

(54) CONTROL DEVICE FOR HYBRID VEHICLE

(75) Inventors: Asami Kubo, Kanagawa (JP); Kenichi Goto, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 77 days.

(21) Appl. No.: 09/959,910

(22) PCT Filed: Mar. 16, 2001

(86) PCT No.: PCT/JP01/02105
§ 371 (c)(1),
(2), (4) Date: Nov. 13, 2001

(87) PCT Pub. No.: WO01/70533
PCT Pub. Date: Sep. 27, 2001

(65) Prior Publication Data
US 2002/0157882 A1 Oct. 31, 2002

(30) Foreign Application Priority Data
Mar. 21, 2000 (JP) .......................................... 2000-78462

(51) Int. Cl.⁷ .................................................. B60K 6/04
(52) U.S. Cl. ...................................... 180/65.4; 180/65.2
(58) Field of Search ............................... 180/65.2, 65.3, 180/65.4, 65.6, 65.8; 320/15, 32; 701/22

(56) References Cited

U.S. PATENT DOCUMENTS

| | | | | |
|---|---|---|---|---|
| 4,931,947 A | * | 6/1990 | Werth et al. ................ | 180/65.8 |
| 5,212,431 A | * | 5/1993 | Origuchi et al. ........... | 180/65.4 |
| 5,367,455 A | * | 11/1994 | Kitagawa et al. ............. | 701/22 |
| 5,793,211 A | | 8/1998 | Shimoyama ................ | 324/427 |
| 5,801,499 A | | 9/1998 | Tsuzuki et al. | |
| 5,819,187 A | * | 10/1998 | Sato et al. ..................... | 701/22 |
| 5,832,396 A | * | 11/1998 | Moroto et al. ................. | 701/22 |
| 5,945,808 A | | 8/1999 | Kikuchi et al. ............. | 320/132 |
| 6,019,183 A | * | 2/2000 | Shimasaki et al. ......... | 180/65.2 |
| 6,116,368 A | * | 9/2000 | Lyons et al. ................ | 180/65.2 |
| 6,233,508 B1 | * | 5/2001 | Deguchi et al. ........... | 180/65.2 |
| 6,314,346 B1 | * | 11/2001 | Kitajima et al. ........... | 180/65.2 |
| 6,470,983 B1 | * | 10/2002 | Amano et al. ............. | 180/65.2 |

FOREIGN PATENT DOCUMENTS

| | | |
|---|---|---|
| DE | 199 25 230 A1 | 12/1999 |
| EP | 0 645 278 | 3/1995 |
| EP | 0 841 208 | 5/1998 |
| EP | 0 916 547 | 5/1999 |
| EP | 0 953 472 | 11/1999 |
| EP | 1 036 696 A1 | 9/2000 |
| GB | 2 319 407 | 5/1998 |
| JP | 10-201003 | 7/1998 |

OTHER PUBLICATIONS

Patent Abstracts of Japan, vol. 2000, No. 4, Aug. 31, 2000; Japanese Patent 2000–030753, issued Jan. 28, 2000.
Patent Abstracts of Japan, vol. 1999, No. 13, Nov. 30, 1999, Japanese Patent 11–218567, issued Aug. 10, 1999.
Patent Abstracts of Japan, vol. 1999, No. 9, Jul. 30, 1999, Japanese Patent 11–103505, issued Apr. 13, 1999.

\* cited by examiner

*Primary Examiner*—Frank Vanaman
(74) *Attorney, Agent, or Firm*—Foley & Lardner (57) ABSTRACT

A vehicle is provided including a high-voltage battery for a motor/generator power source, a low-voltage battery for electrical loads, an inverter for controlling the motor/generator, sensors which detect a condition of the high-voltage battery, a rotation speed of the engine, a vehicle speed, and a depression of an accelerator pedal, and a microprocessor. The microprocessor is programmed to compute a state of charge (SOC) of the high-voltage battery, compute a degree of deterioration of the high-voltage battery, control a current generated by the motor/generator so that the SOC of the high-voltage battery coincides with a target SOC, vary the target SOC according to the degree of deterioration of the high-voltage battery, determine whether or not the vehicle is decelerating, and set the target SOC to the low target SOC when the vehicle is not decelerating and to the high target SOC when the vehicle is decelerating.

6 Claims, 7 Drawing Sheets

CONTROL DEVICE FOR HYBRID VEHICLE

FIELD OF THE INVENTION

This invention relates to a control device for a hybrid vehicle which comprises an engine and an electric motor as a source of drive force, the electric motor being used as a generator.

BACKGROUND OF THE INVENTION

Recently, the hybrid vehicle comprising an engine acting as a source of motive power for running the vehicle and an electric motor having a battery as a power supply has been developed. Tokkai Hei 10-201003 published by the Japanese Patent Office in 1998 discloses a hybrid vehicle having a generator in addition to an electric motor, the generator normally being driven in order to return the state of charge (SOC) of the battery to a fully charged level when the state of charge of the battery decreases.

SUMMARY OF THE INVENTION

However, in this type of hybrid vehicle, there is no provision for handling the battery charge of a deteriorated battery. As a result, when the battery consumes electric power, the state of charge is increased to substantially an initial fully charged level rather than the actual fully charged level. Unlike the battery in an initial state wherein there is no deterioration (i.e., unlike a brand-new battery), the deteriorated battery has the possibility of being overcharged when the control described above is used. This is because the fully charged level of a deteriorated battery is lower than an initial fully charged level.

Moreover, when a battery has deteriorated, the chargeable capacity of the battery while the vehicle is decelerating is eliminated as a result of the lowered chargeable level if a target state of charge is maintained at a high level in a non-deceleration driving state. This results in inefficient regeneration of energy.

Furthermore it is necessary to provide for battery deterioration in a hybrid vehicle provided with an idle-stop function which can automatically stop the engine when the vehicle is brought to a temporary halt and automatically restart the engine with the electric motor when predetermined conditions are fulfilled. This is due to the fact that when the battery deteriorates, a voltage drop occurs as a result of the increase in the internal resistance of the battery and therefore the electric motor cannot generate a sufficient output to start the engine.

It is therefore an object of this invention to avoid overcharging of a battery by controlling a battery state of charge in response to the actual chargeable capacity of a battery which is undergoing deterioration.

It is a further object of this invention to maintain a chargeable capacity of a battery and to increase the efficiency of regeneration of energy during deceleration.

It is yet a further object of this invention to guarantee stable vehicle restarting and to avoid shortfalls in the output of the electric motor when restarting the engine after an idle-stop operation.

In order to achieve above objects, this invention provides a control device for a hybrid vehicle, the vehicle having an engine (1) as a power source for running the vehicle and a motor/generator (2), and the control device comprising a high-voltage battery (11) which functions as a power source for the motor/generator (2), a low-voltage battery (14) for vehicle-mounted electrical loads which has a lower voltage than the high-voltage battery (11), an inverter (12) for controlling the motor/generator (2), a sensor (18,19) which detects a condition of the high-voltage battery (11); and a microprocessor (16).

The microprocessor is programmed to compute a state of charge (SOC) of the high-voltage battery (11) based on the condition of the high-voltage battery (11), compute a degree of deterioration of the high-voltage battery (11) based on the condition of the high-voltage battery (11), control a current generated by the motor/generator (2) so that the SOC of the high-voltage battery (11) coincides with a target SOC; and vary the target SOC according to the degree of deterioration of the high-voltage battery (11).

The details as well as other features and advantages of this invention are set forth in the remainder of the specification and are shown in the accompanying drawings.

DESCRIPTION OF THE PREFERRED EMBODIMENTS

Figure 1:
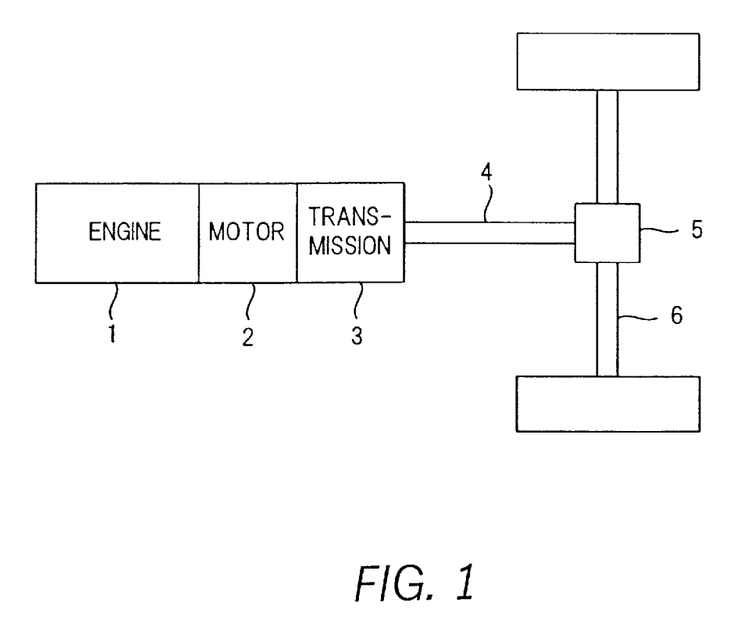
FIG. 1 is a schematic diagram of a drive system for a hybrid vehicle according to this invention.

Referring to FIG. 1 of the drawings, a hybrid vehicle applying this invention comprises an engine 1, a motor/generator 2 which is directly connected to the engine 1, a transmission 3 which is connected to the motor/generator 2, an output shaft 4 of the transmission 3 and a drive shaft 6 which transmits the rotation of the output shaft 4 through a differential gear 5.

The vehicle is provided with an idle-stop function which automatically stops the engine 1 for example when the vehicle is temporarily stationary. The motor/generator 2 cranks the engine 1 when the engine 1 is started. For example, the motor/generator 2 restarts the engine 1 on each occasion that conditions for engine restart are satisfied after an idle-stop operation. In contrast, the motor/generator 2 is driven as a generator during deceleration in order to regenerate the inertial energy of the running vehicle. In addition, the motor/generator 2 charges the battery and supplies electrical current for other electrical loads.

Figure 2:
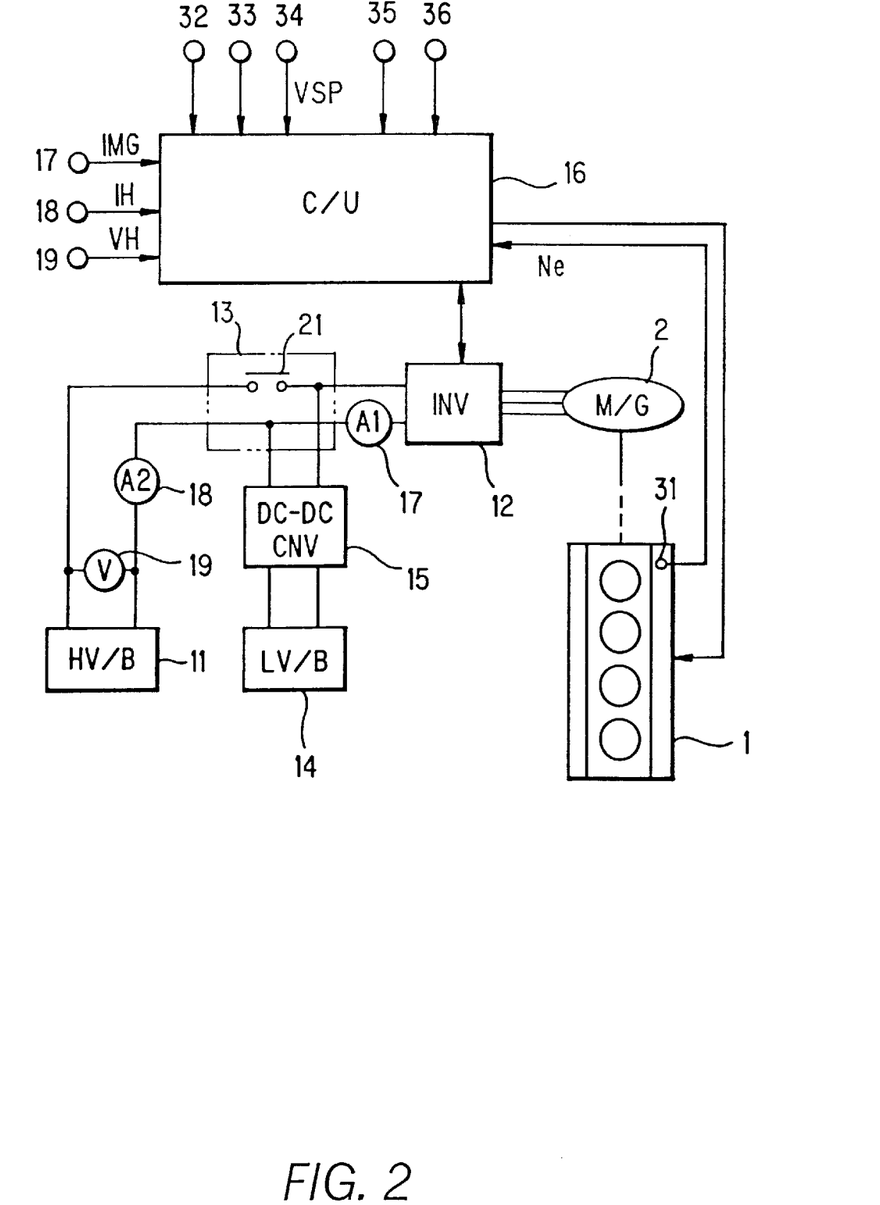
FIG. 2 is a schematic diagram of a control device for a hybrid vehicle according to this invention.

Referring to FIG. 2, the electrical power supply system of a hybrid vehicle applying this invention comprises a high-voltage battery 11, an inverter 12, a junction box 13, a low-voltage battery 14 and a DC/DC converter 15. The high-voltage battery 11 acts as a charging/discharging power source and is rated to 42[V]. More precisely, the high-voltage battery 11 is a lead-acid battery (a lead storage battery having an electrode of a lead grid containing lead_ oxide whereof the composition changes during charging and discharging, and an electrolyte of dilute sulfuric acid).

Referring to FIG. 2, a control device for a hybrid vehicle according to this invention comprises a control unit (C/U) 16, a first current sensor 17 which detects a generated current IMG generated by the motor/generator 2 and converted by the inverter 12, a second current sensor 18 which detects a charging current (or a discharging current) IH to the high-voltage battery 11, a voltage sensor 19 which detects terminal voltage VH of the high-voltage battery 11, a rotation speed sensor 31 which detects a rotation speed Ne of the engine 1, a key switch 32, a start switch 33, a vehicle speed sensor 34 which detects a vehicle speed VSP, an idle switch 35 which detects the release or depression of the accelerator pedal and a brake switch 36 which detects the depression of the brake pedal.

When the motor/generator 2 is driven as a generator, a three-phase current generated by the motor/generator 2 is converted to a DC current by the inverter 12 and supplied to the high-voltage battery 11 through the junction box 13. On the other hand, when the motor/generator 2 functions as a motor when electrical current is discharged, electrical power from the high-voltage battery 11 is converted to a three-phase current through the inverter 12 and the junction box 13 and supplied to the motor/generator 2.

A low-voltage battery 14 which acts as a power source for vehicle-mounted electrical loads including engine auxiliary loads is a standard lead-acid battery rated to 14 [V]. After a part of the generated current from the motor/generator 2 passes through the inverter 12 and the junction box 13, it is stored in the low-voltage battery 14 via the DC/DC converter 15.

The control unit (C/U) 16 comprises a timer and a microprocessor which has a central processing unit (CPU), a random access memory (RAM), a read only memory (ROM) and an input/output interface (I/O interface) (not shown). The control unit 16 controls the motor/generator 2 through the inverter 12. Furthermore the control unit 16 controls the engine 1. The control unit 16 performs the idle-stop control and the battery charge/discharge control based on signals from the sensors described above.

The control unit 16 sets the target state of charge tSOC of the high-voltage battery 11 and the threshold value of state of charge SOCa of the high-voltage battery 11. Here the threshold value SOCa is a threshold value used when determining whether or not an idle-stop operation is permitted The idle-stop operation is allowed only when the actual state of charge is greater than the threshold value SOCa.

Control performed by the control unit 16 will be described below based on the flowcharts in FIG. 3 to FIG. 7.

Figure 3:
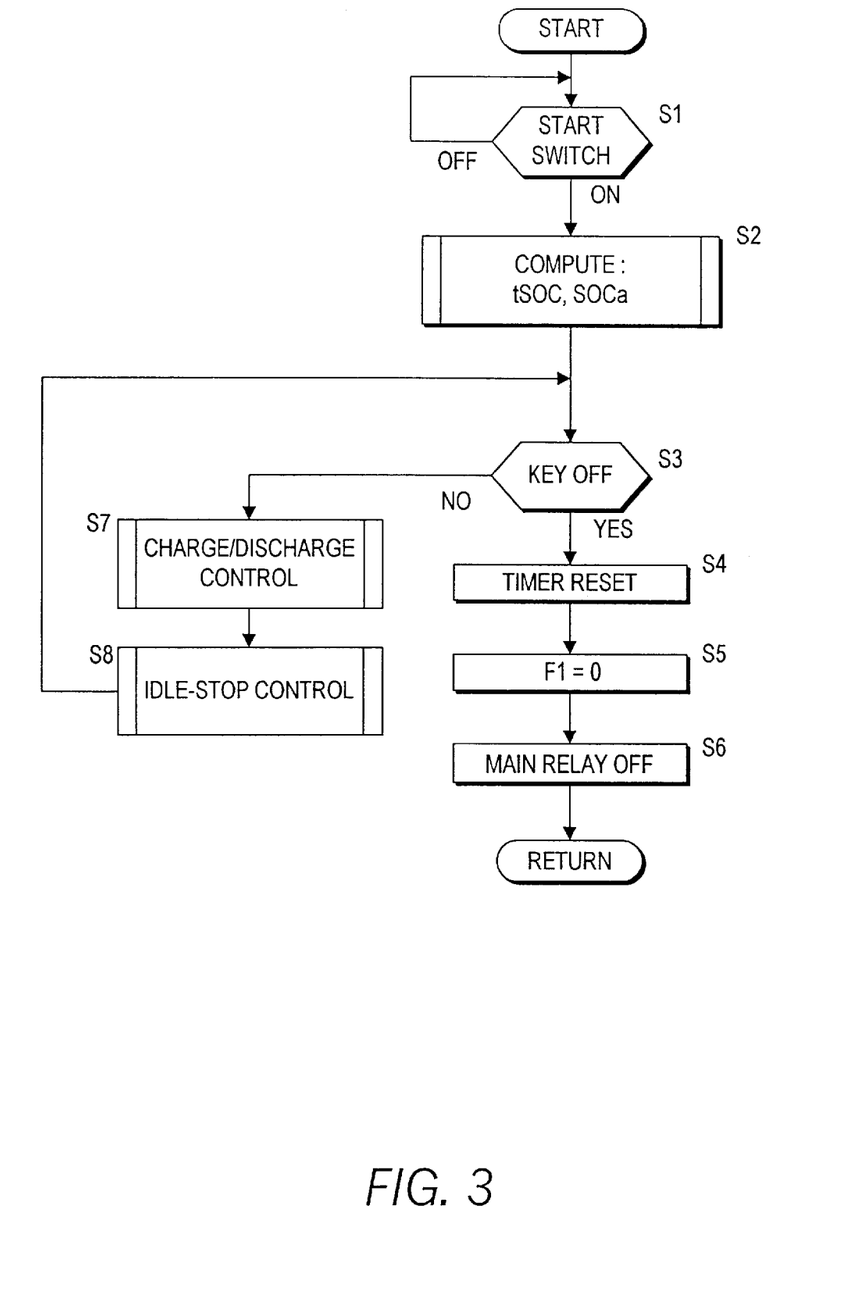
FIG. 3 is a flowchart describing a main control routine executed by a control unit according to this invention.

Referring to FIG. 3, the main control routine performed by the control unit 16 according to this invention will be described.

When the engine key (hereafter referred to as key) is placed in the ON position, firstly in a step SI, the control unit 16 determines whether the start switch is in the ON or OFF position. When the start switch is ON, the routine proceeds to a step S2 where the target state of charge tSOC and the threshold value of state of charge SOCa are computed.

Figure 6:
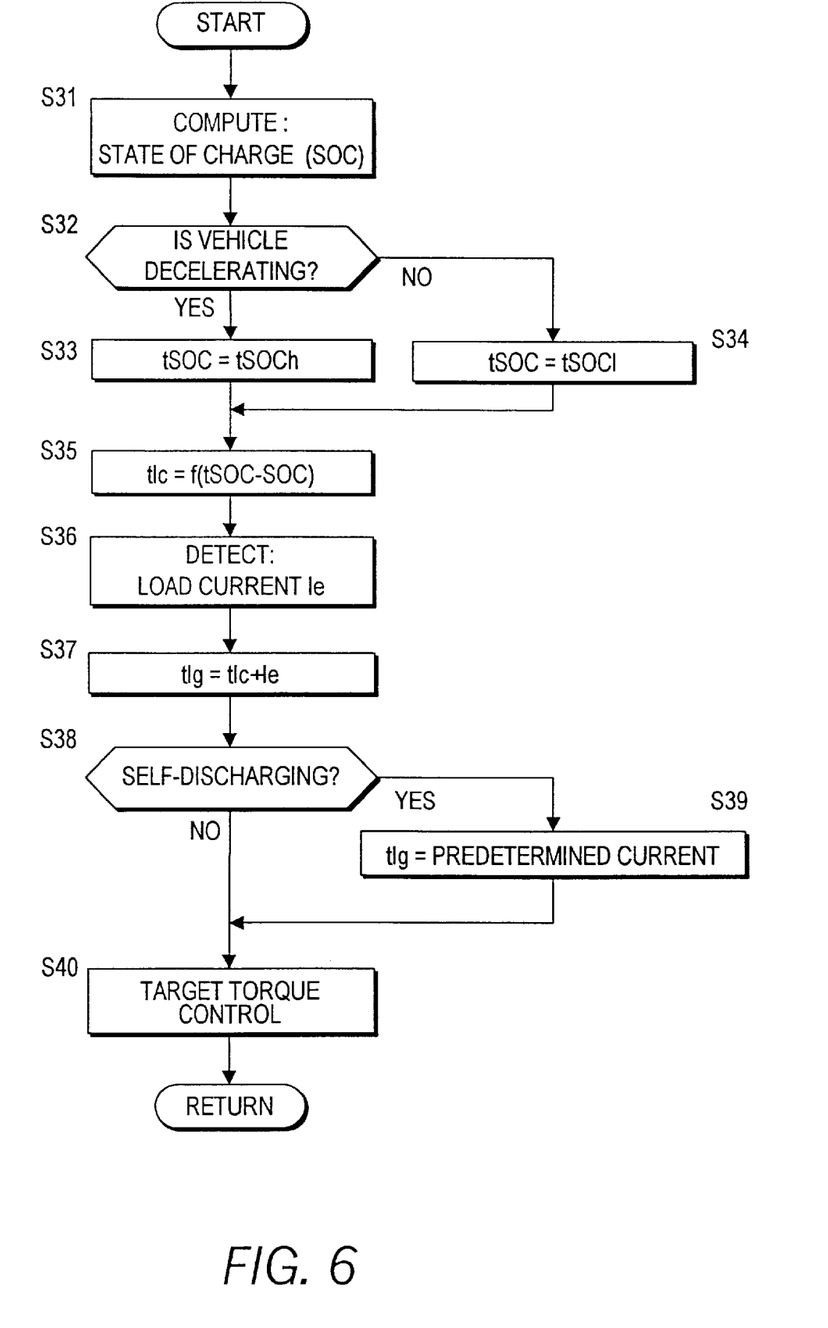
FIG. 6 is a flowchart describing a charge/discharge control routine executed by a control unit according to this invention.
Figure 7:
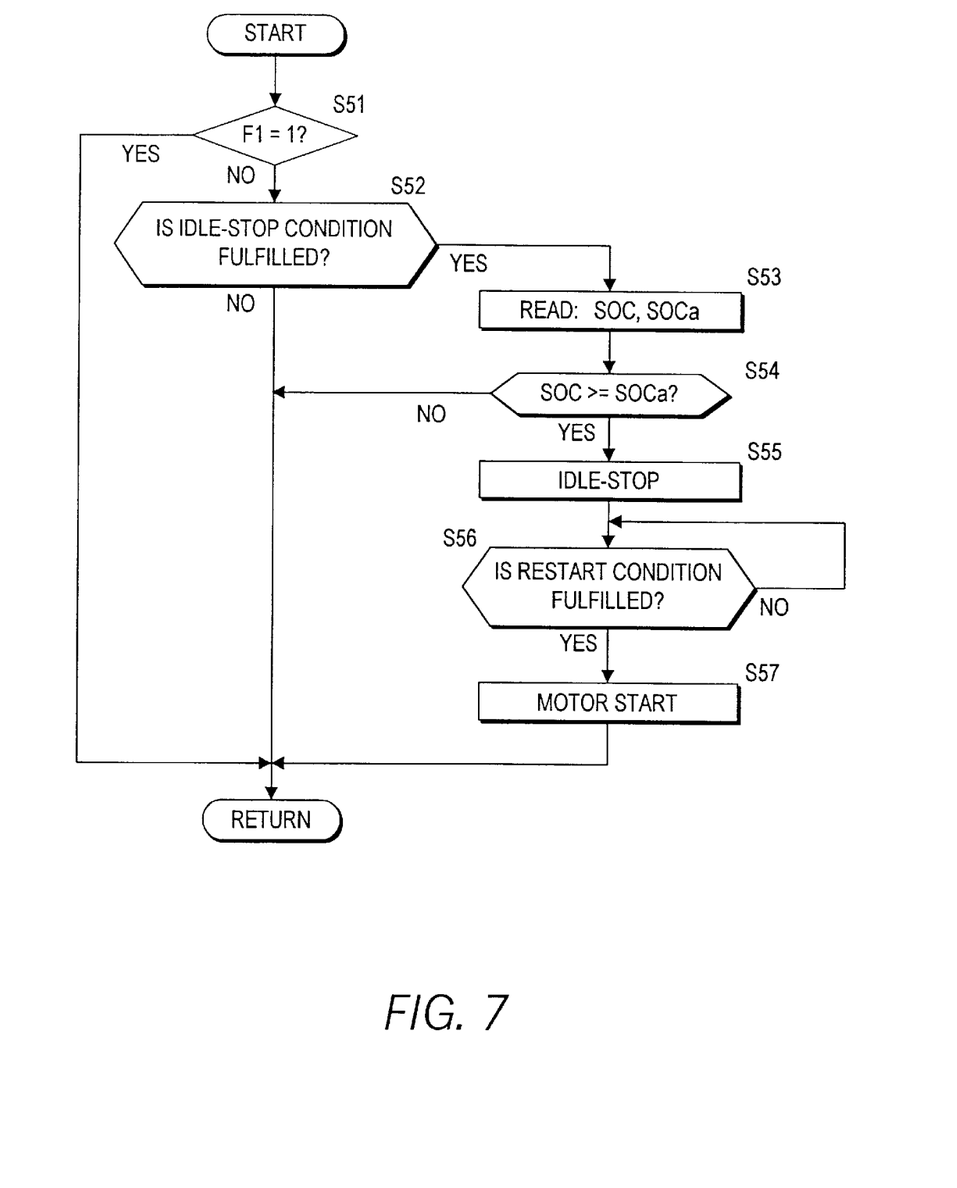
FIG. 7 is a flowchart describing an idle-stop control routine executed by a control unit according to this invention.

Then in a step S3, it is determined whether the key is in the ON or the OFF position. When the key is in the OFF position, a timer is reset in a step S4. When the key is in the ON position, the battery charge/discharge control routine shown by the flowchart in FIG. 6 and the idle-stop control routine shown by the flowchart in FIG. 7 are executed in a step S7 and S8, respectively until the key is in the OFF position.

After the step S4, the routine proceeds to a step S5. In the step S5, a flag F1 is set to zero. The flag F1 is used when the control unit 16 determines whether or not an idle-stop operation is permitted. When the flag has a value of zero, i.e. F1=0, the idle-stop operation is allowed and when the flag has a value of one, i.e. F1=1, the idle-stop operation is prohibited. In a step S6, the main routine is terminated, placing the main relay 21 in the junction box 13 in an OFF position and opening the terminal of the high-voltage battery 11.

Figure 4:
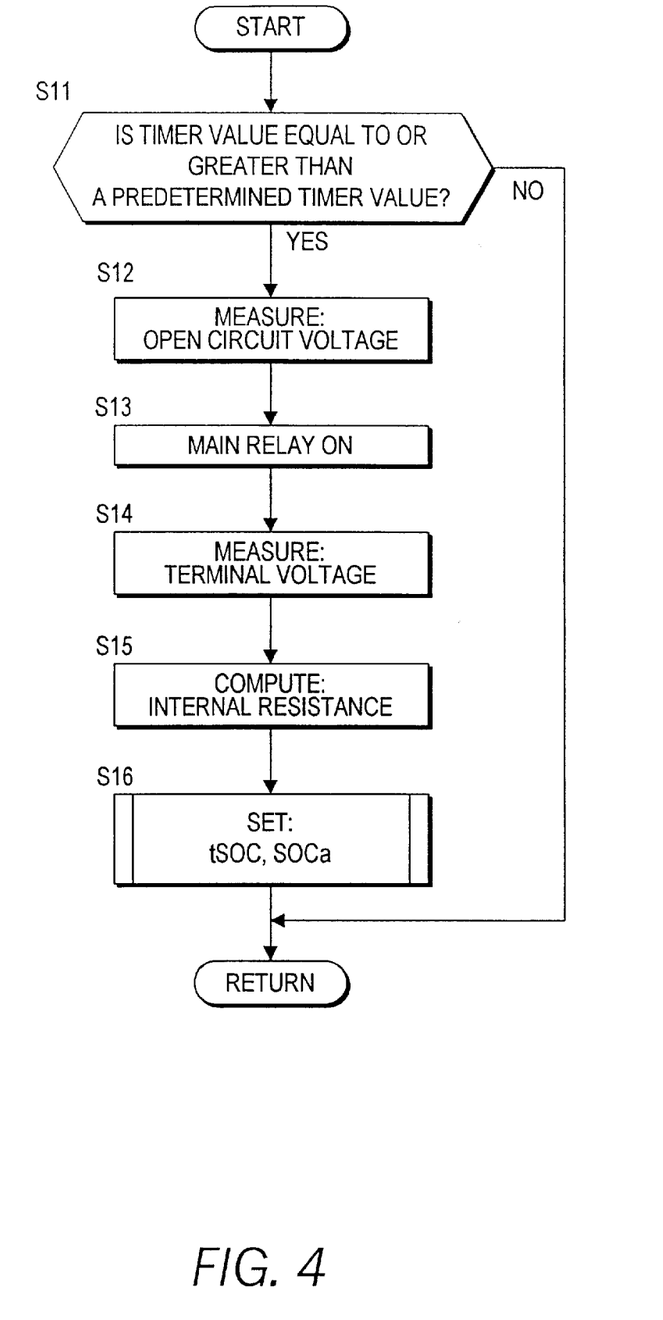
FIG. 4 is a flowchart describing a sub-routine in FIG. 3, for computing a threshold value SOCa of a state of charge and a target state of charge tSOC.

Referring to the flowchart shown in FIG. 4, a sub-routine for computing the target state of charge tSOC and the threshold value of state of charge SOCa in the step S2 will be described. Firstly in a step S11, it is determined whether or not a timer value which has been reset when the key has been placed in the OFF position is greater than or equal to a predetermined timer value. That is to say, in this step, it is determined whether or not a predetermined time, for example three hours has passed since the key has been placed in an OFF position.

When the timer value is less than the predetermined timer value, the routine is returned. On the other hand, when the timer value is greater than or equal to the predetermined timer value, the routine proceeds to a step S12 where the open circuit voltage OCV of the high-voltage battery 11 is measured. Thus it is possible to measure the open circuit voltage OCV after the high-voltage battery 11 is in an equilibrium state by waiting for more than a predetermined time after the main relay is placed in the OFF position.

After the open circuit voltage OCV is measured, in a step S13, the control unit 16 places the main relay in an ON position and starts the engine 1 with the motor/generator 2. Then in a step S14, the terminal voltage VH of the high-voltage battery 11 when the engine is starting is measured. The internal resistance R of the high-voltage battery 11 is computed in a step S15.

The internal resistance R is calculated based on the open circuit voltage OCV of the high-voltage battery 11 in an equilibrium state and the terminal voltage VH during discharge of large currents to start the engine. This allows the internal resistance R to be calculated in a simple manner without being affected by dielectric polarization.

It is possible to calculate the internal resistance R based on the open circuit voltage OCV and the terminal voltage VH from Equation (1).

$$R=(OCV-VH)/IH \qquad (1)$$

When discharging large currents, the discharged current IH from the high-voltage battery 11 is approximately fixed irrespectively of the degree of battery deterioration. The internal resistance of the battery calculated in the above manner has the characteristic that it varies in response to a degree of deterioration.

In the step S16, a target state of charge tSOC and a threshold value of state of charge SOCa are set based on the internal resistance R calculated from Equation (1).

Figure 5:
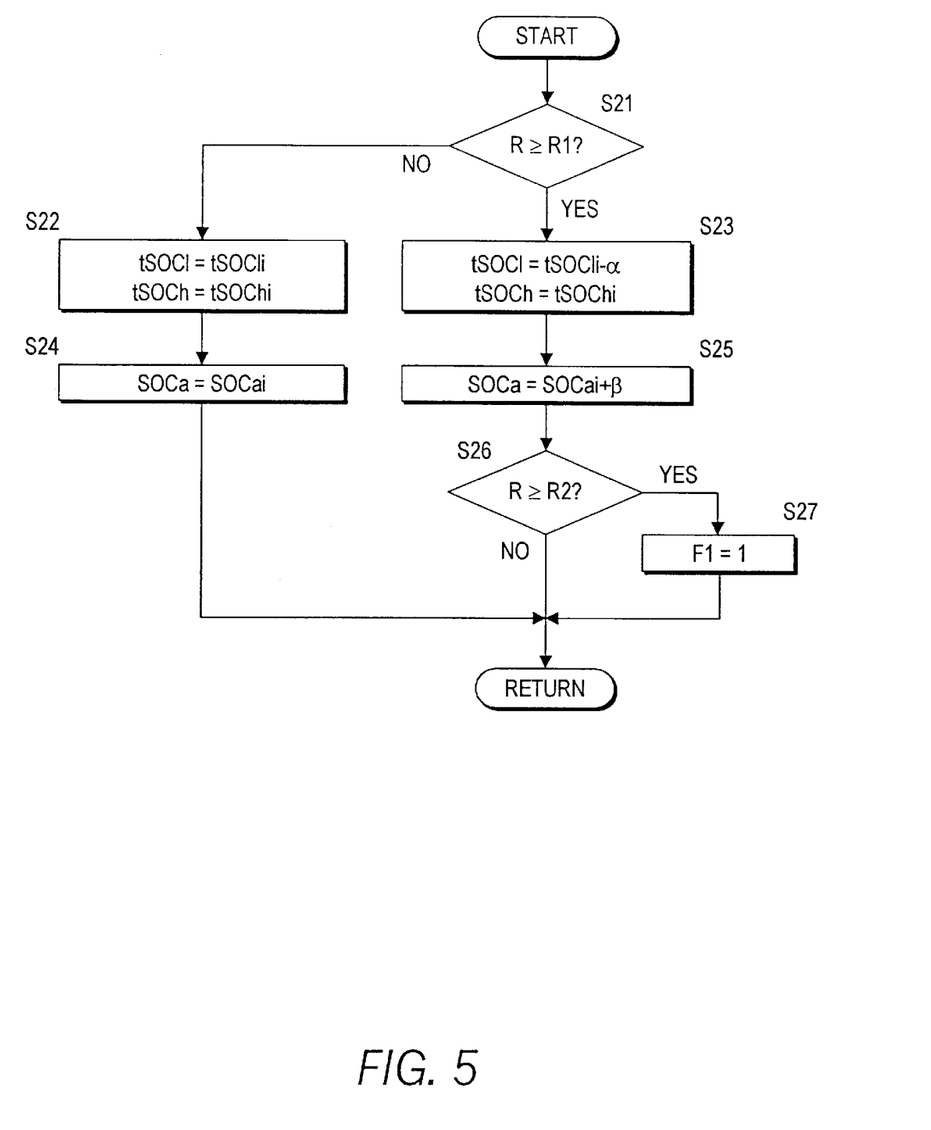
FIG. 5 is a flowchart describing the sub-routine in FIG. 4.

Referring to FIG. 5, the sub-routine executed in the step S16 will be described. In a step S21, when it is determined that the internal resistance R is smaller than a first predetermined resistance R1, the routine proceeds to a step S22. On the other hand, when it is determined that the internal resistance R is greater than or equal to the first predetermined resistance R1, the routine proceeds to a step S23. For example, the first predetermined resistance R1 is set to about 125% of the internal resistance of the high-voltage battery in an initial state wherein there is no deterioration (i.e. the brand-new battery).

This invention is adapted to switch over the target state of charge tSOC between a low target state of charge tSOCl when the vehicle is not decelerating and a high target state of charge tSOCh when the vehicle is decelerating.

In the steps S22 to S23, the low target state of charge tSOCl which is used in a non-deceleration driving state and the high target state of charge tSOCh which is used in a deceleration driving state are set in response to the internal resistance R. The low target state of charge tSOCl is set to be less than the high target state of charge tSOCh so that there is a chargeable capacity in the battery when the vehicle starts decelerating. That is to say, the setting is tSOCl<tSOCh. In this manner, the energy regeneration efficiency of the vehicle when decelerating is increased.

In a step S22, a low target state of charge tSOCl and a high target state of charge tSOCh are respectively set as tSOCli and tSOChi. tSOCli and tSOChi are pre-set values, fitted for the initial state of the high-voltage battery.

The value of tSOCli is set to 80% for example. When the detected deviation in the state of charge is ±e, for example ±5%, the value of tSOChi is set to 100−e, for example 95%. The value of tSOChI which corresponds to a fully charged level is determined in consideration of a detected deviation (or estimated deviation) of the state of charge SOC in order to avoid overcharging.

In a step S23, the low target state of charge tSOCl is reduced by a first predetermined value $\alpha$, for example 5%, according to the deterioration in the high-voltage battery 11. That is to say, tSOCl is set to a lower value tSOClα, for example, to 75%.

Furthermore when the battery has deteriorated, tSOCh may be set to a value which is lower than tSOChi by a second predetermined value $\gamma$, for example 5%, in order to avoid overcharging. Also tSOCl and tSOCh may be respectively set to low values in response to the degree of deterioration of the high-voltage battery 11.

After the target state of charge is varied, the threshold value for the state of charge SOCa is determined in response to the degree of deterioration of the high-voltage battery 11.

In a step S21, when the internal resistance R is determined to be smaller than the first predetermined resistance R1, the routine proceeds to a step S24 from the step S22. In the step S22, the threshold value for the state of charge SOCa is set to a predetermined state of charge SOCai which is a threshold value fitted for the initial state of the high-voltage battery. The predetermined state of charge SOCai is set on the basis of mechanical friction and the inertial mass of the engine components in addition to the output characteristics and capacity of the high-voltage battery 11.

On the other hand, when the internal resistance R is greater than or equal to the first predetermined resistance R1, the routine proceeds to a step S25 from the step S23. In the step S25, the threshold value for the state of charge SOCa is set to a value (SOCai+$\beta$) greater than SOCai by a third predetermined value $\beta$, for example 5%. In this manner, when the vehicle is restarted after the idle-stop operation, it is possible to avoid shortfalls in the output of the motor/generator 2 and stable restarting of the vehicle is guaranteed.

When the internal resistance R is greater than or equal to the first predetermined resistance R1, in a further step S26, it is determined whether or not the internal resistance R is greater than or equal to a second predetermined resistance R2. Here R2 is greater than R1. For example, the second predetermined resistance R2 is set to about 150% of the internal resistance of the high-voltage battery in the initial state. When the internal resistance R is smaller than the second predetermined resistance R2, the routine is returned.

When the internal resistance R is greater than or equal to a second predetermined resistance R2, the routine proceeds to a step S27. After the flag F1 is set to a value of one in the step S27, the routine is returned. The flag F1 is set to zero when the key is in the OFF position. However after the engine is started thereafter, the flag F1 is set to a value of one when the internal resistance R of the battery is determined to be greater than or equal to the second predetermined resistance R2. When the flag F1 is set to a value of one, the idle-stop operation is prohibited.

Referring to the flowchart in FIG. 6, the charge/discharge control routine of the high-voltage battery 11 will be described below. Firstly in a step S31, the actual state of charge SOC of the high-voltage battery 11 is computed. The control unit 16 computes the state of charge SOC, for example by integrating over time the charging and discharging current IH detected by the second current sensor 18.

Then in the step S32, it is determined whether or not the vehicle is currently decelerating based on the idle switch signal, the engine speed Ne and the vehicle speed VSP. When Ne is greater than or equal to a predetermined engine speed, VSP is greater than or equal to a predetermined vehicle speed, and the idle switch is in the ON position (the accelerator pedal is released), it is determined that the vehicle is decelerating. Thereupon the routine proceeds to a step S33. In the step S33, the target state of charge tSOC is set to a high target state of charge tSOCh, for example 95% in order to regenerate sufficient energy. On the other hand, when the vehicle is not decelerating, the routine proceeds to a step S34 and the target state of charge tSOC is set to a low target state of charge tSOCl, for example 75% in order to leave a capacity to allow a sufficient regeneration of energy.

In a step S35, the target state of charge tSOC (that is to say, tSOCh or tSOCl) is compared with the actual state of charge SOC. A feedback control amount for the state of charge is calculated by multiplying the gain K based on proportional integral control by the difference (tSOC−SOC). This feedback control amount is converted to the target charging current tIc to the high-voltage battery 11.

In a step S36, the charging current for vehicle-mounted electrical loads Ie is estimated in the following manner. The charging current IH to the high-voltage battery 11 is subtracted from the generated current IMG of the motor/generator 2 in order to calculate the charging current to the low-voltage battery 14. The charging current to the low-voltage battery 14 is taken to be an electrical load current Ie (Ie=IMG−IH).

In a step S37, the target charging current tIc and the electrical-load current Ie are added to calculate the target generated current tIg of the motor/generator 2. (That is to say, tIg=tIc+Ie). In a step S38, it is determined whether or not the high-voltage battery 11 is self-discharging. When the battery is self-discharging, the routine proceeds to a step S39. In the step S39, the target generated current tIg is set to a predetermined current of approximately 1~2 [A], and then the routine proceeds to a step S40. The motor/generator 2 generates an ineffectual current in order to prevent deterioration of the high-voltage battery during self-discharge. On the other hand, when the high-voltage battery is not self-discharging, the routine proceeds directly to a step S40.

In the step S40, a target torque which is supplied to the motor/generator 2 is controlled so that the actual motor generated current is equal to the target generated current tIg.

The above charge/discharge control allows the target state of charge tSOC to be set to a low value according to the battery deterioration when the vehicle is not decelerating. (That is to say, tSOC=tSOCl=tSOCli−$\alpha$). Therefore the chargeable capacity of the battery during deceleration can be ensured, even if there is a high degree of battery deterioration. Thus in this manner, it is possible to regenerate energy consumed during deceleration effectively with a relatively simple control routine.

Referring to the flowchart in FIG. 7, the idle-stop control routine will be described below.

Firstly in a step S51, it is determined whether or not the flag F1 has a value of one. When the flag F1 has a value of one, the degree of battery deterioration is high. In this case the idle-stop operation must be prohibited in order to avoid a shortfall in the output of the electrical motor required for restarting the engine. Therefore the routine is returned.

In a step S51, when the flag F1 does not have a value of one, that is to say, F1=0, the routine proceeds to a step S52 and it is determined whether or not idle-stop conditions are satisfied. The idle-stop conditions are defined as being that the vehicle is brought to a temporary halt with the engine running at idle speed. Specifically, the idle-stop conditions is defined as the brake switch being in the ON position, the idle switch being in the ON position, the engine rotation speed Ne being in the vicinity of an idle rotation speed and the vehicle speed being zero.

When the idle-stop conditions are satisfied, the routine proceeds to a step S53 and the actual state of charge SOC and threshold value for state of charge SOCa are read.

In a step S54, the actual state of charge SOC and state of charge threshold value SOCa are compared. The idle-stop operation is prohibited when the state of charge SOC is less than the threshold value SOCa. When the high-voltage battery has deteriorated, a state of charge SOC required to restart the engine becomes higher. In this case, in the step S25, the threshold value SOCa has been already set to a value (SOCai+β) which is greater than the threshold value in the initial state SOCaI. In this manner, the idle-stop operation is prohibited in response to the degree of deterioration of the high-voltage battery 11.

On the other hand, when the state of charge SOC is greater than or equal to the threshold value SOCa, the idle-stop is permitted since the state of charge is sufficient to restart the engine. In this case, the routine proceeds to a step S55 and the control unit 16 commands the engine 1 to stop.

After the idle-stop operation, in a step S56, it is determined whether or not the engine restart conditions are satisfied. The engine restart conditions are for example that the idle switch is in the OFF position (the accelerator pedal is depressed) and the brake switch is in the OFF position. When the engine restart conditions are satisfied, the routine proceeds to a step S57 and the engine 1 is restarted by the motor/generator 2.

In this embodiment, a target state of charge tSOC of the high-voltage battery 11 and a threshold value of the state of charge SOCa of the high-voltage battery 11 are switched between two values in response to the internal resistance. However the target state of charge tSOC and the threshold value of the state of charge SOCa may be set in a more detailed manner by referring to a map.

The entire contents of Japanese Patent Applications P2000-78462 (filed Mar. 21, 2000) are incorporated herein by reference.

Although the invention has been described above by reference to a certain embodiment of the invention, the invention is not limited to the embodiment described above Modifications and variations of the embodiment described above will occur to those skilled in the art, in light of the above teachings. The scope of the invention is defined with reference to the following claims.

What is claimed is:

1. A control device for a hybrid vehicle which comprises an engine as a power source for running the vehicle and a motor/generator, comprising:

a high-voltage battery which functions as a power source for the motor/generator;

a low-voltage battery for vehicle-mounted electrical loads which has a lower voltage than the high-voltage battery;

an inverter for controlling the motor/generator;

a sensor which detects a condition of the high-voltage battery;

a sensor which detects a rotation speed of the engine;

a sensor which detects a vehicle speed;

a sensor which detects depression of an accelerator pedal; and a microprocessor which is programmed to:

compute a state of charge (SOC) of the high-voltage battery based on the condition of the high-voltage battery;

compute a degree of deterioration of the high-voltage battery based on the condition of the high-voltage battery;

control a current generated by the motor/generator so that the SOC of the high-voltage battery coincides with a target SOC;

vary the target SOC according to the degree of deterioration of the high-voltage battery;

determine whether or not the vehicle is decelerating, based on the rotation speed of the engine, the vehicle speed and the depression of the accelerator pedal; and set the target SOC to a low target SOC when the vehicle is not decelerating and to set the target SOC to a high target SOC when the vehicle is decelerating, wherein the low target SOC is lower than the high target SOC.

2. The control device as defined in claim 1, wherein the microprocessor is further programmed to decrease the low target SOC with an increase in the degree of deterioration in the high-voltage battery.

3. The control device as defined in claim 1, wherein the microprocessor is further programmed to decrease the high target SOC with an increase in the degree of deterioration in the high-voltage battery.

4. A control device for a hybrid vehicle which comprises an engine as a power source for running the vehicle and a motor/generator, comprising:

a high-voltage battery which functions as a power source for the motor/generator;

a low-voltage battery for vehicle-mounted electrical loads which has a lower voltage than the high-voltage battery;

an inverter for controlling the motor/generator;

a sensor which detects a condition of the high-voltage battery; and a microprocessor which is programmed to:

compute a state of charge (SOC) of the high-voltage battery based on the condition of the high-voltage battery;

compute a degree of deterioration of the high-voltage battery based on the condition of the high-voltage battery;

control a current generated by the motor/generator so that the SOC of the high-voltage battery coincides with a target SOC;

vary the target SOC according to the degree of deterioration of the high-voltage battery;

determine whether or not the high-voltage battery is self-discharging, based on the condition of the high-voltage battery; and command the motor/generator to generate a predetermined current when the high-voltage battery is self-discharging.

5. A control device for a hybrid vehicle which comprises an engine as a power source for running the vehicle and a motor/generator, comprising:

a high-voltage battery which functions as a power source for the motor/generator;

a low-voltage battery for vehicle-mounted electrical loads which has a lower voltage than the high-voltage battery;

an inverter for controlling the motor/generator;

a sensor which detects a condition of the high-voltage battery; and a microprocessor which is programmed to:

compute a state of charge (SOC) of the high-voltage battery based on the condition of the high-voltage battery;

compute a degree of deterioration of the high-voltage battery based on the condition of the high-voltage battery;

control a current generated by the motor/generator so that the SOC of the high-voltage battery coincides with a target SOC;

vary the target SOC according to the degree of deterioration of the high-voltage battery; and compute the degree of deterioration of the high-voltage battery when a start switch is placed in an ON position and a time which has elapsed after a key has been placed in an OFF position is greater than or equal to a predetermined time.

6. A control device for a hybrid vehicle which comprises an engine as a power source for running the vehicle and a motor/generator, comprising:

a high-voltage battery which functions as a power source of the motor/generator;

a low-voltage battery for vehicle-mounted electrical loads which has a lower voltage than the high-voltage battery;

an inverter for controlling the motor/generator;

a sensor which detects a condition of the high-voltage battery;

a sensor which detects a rotation speed of the engine;

a sensor which detects a vehicle speed;

a sensor which detects depression of an accelerator pedal;

a sensor which detects depression of a brake pedal; and a microprocessor programmed to:

compute a state of charge (SOC) of the high-voltage battery based on the condition of the high-voltage battery;

determine whether or not the vehicle is brought to a temporary halt with the engine running at idle speed, based on the rotation speed of the engine, the vehicle speed, the depression of the accelerator pedal, and the depression of the brake pedal;

stop the engine when the SOC of the high-voltage battery is greater than or equal to a threshold value and when the vehicle is brought to the temporary halt with the engine running at the idle speed;

compute a degree of deterioration of the high-voltage battery based on the condition of the high-voltage battery; and vary the threshold value according to the degree of deterioration of the high-voltage battery; and compute the degree of deterioration of the high-voltage battery when a start switch is placed in an ON position and a time which has elapsed after a key has been placed in an OFF position is greater than or equal to a predetermined time.

* * * * *